Sept. 13, 1960 TAKESHI GOSHIMA 2,952,194
PHOTOGRAPHIC EXPOSURE METER COUPLED TO THE
SHUTTER SPEED INDICATOR OF A CAMERA
Filed Sept. 19, 1958

INVENTOR.
TAKESHI GOSHIMA
BY
ATTORNEY

United States Patent Office 2,952,194
Patented Sept. 13, 1960

2,952,194

PHOTOGRAPHIC EXPOSURE METER COUPLED TO THE SHUTTER SPEED INDICATOR OF A CAMERA

Takeshi Goshima, Tokyo, Japan, assignor to Canon Camera Company, Inc., Tokyo, Japan, a corporation of Japan Filed Sept. 19, 1958, Ser. No. 762,017

4 Claims. (Cl. 95—10)

This invention relates to exposure meters for photographic use and more particularly to mechanisms intercoupling various adjustable dials, such as the film indicator, the shutter speed indicator and the lens opening indicator of exposure meters. The present invention will be described in the form of an illustrative embodiment incorporated in a built-in type exposure meter but is not limited to such type, being equally applicable to detachable and independent types of exposure meters.

Exposure meters usually are provided with a shutter speed indicator, an emulsion speed indicator and a lens aperture indicator, which indicators should be adjustable with some inter-relation when the exposure meter is coupled to the camera. In such exposure meters, the pointer of the meter will swing according to the amount of light incident upon the photocell of the meter, and the pointer indicates the proper shutter speed, or lens aperture, on the respective one of the dials mentioned above. In such prior known exposure meters, the emulsion speed indicator is adjustably coupled, or riveted, to the shutter speed or lens aperture, indicator and is coaxial therewith. The emulsion speed index is adjusted to a reference mark on the shutter speed, or lens aperture, indicator which, in turn, is set relative to a reference mark on the exposure meter housing. Exposure meters of this kind have the objection that while on adjusting one of the concentric indicators, the other indicator has to be held.

An object of this invention is to provide an exposure meter in which each indicator is located at a spatially separated position and is adjustable without objectionable effect on the other indicators while maintaining the necessary cooperating relation required in an exposure meter.

Another object of this invention is to provide a simple mechanism for the necessary cooperation between each indicator. Some prior known exposure meters are provided with a planetary gear mechanism or other complicated gear trains to maintain cooperation between these indicators.

A further object is to graduate the scales of the respective indicators in equal steps or graduations so that adjustment or movement through one graduation effects movement of the other indicator likewise through one graduation. To this end, each indicator is graduated to twice and half, respectively, the indicated value of its adjacent graduations.

Figure 1:
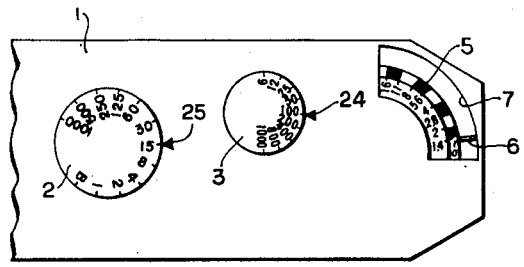
Figure 2:
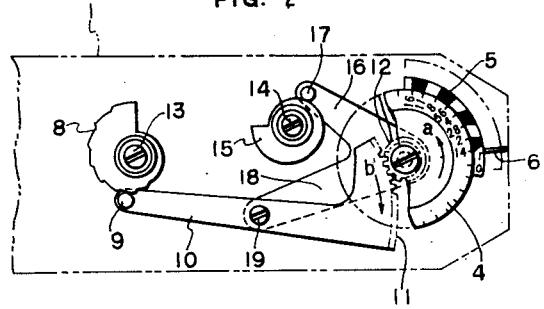
Figure 3:
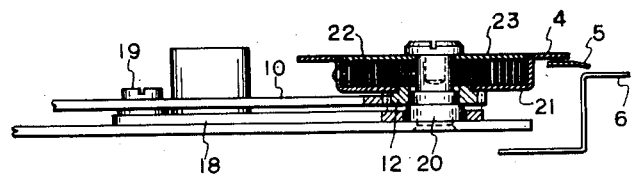

Figure 1 shows a plan view of an illustrative embodiment of the exposure meter of this invention, Figure 2 shows the lever and cam mechanism for the embodiment, and Figure 3 shows a partial sectional view in an enlarged scale.

Referring to the drawing, above the top wall or cover 1 of the camera a shutter speed indicator 2 and an emulsion speed indicator 3 are rotatably supported. The cover 1 is provided with an arcuate aperture 7, and a lens aperture indicator 4 is pivotally mounted coaxially to the aperture and therebelow. A needle pointer 6 carried by the rotatable meter coil, not shown, to which the photoelectric current is applied, projects with its free end into aperture 7, and a non-uniformly graduated arcuate scale 5, corresponding to the characteristic of the meter element, is affixed to the inner arcuate edge of aperture 7, as shown in the drawing. A multi-step cam 8 is mounted on shaft 13 and shutter speed dial 2, integral with multi-step cam 8, is rotatable therewith. A cam 15 is integral with emulsion speed indicator 3 and is integrally on rotatable shaft 14. A pinion 12 is integral with the lens aperture indicator 4, both being rotatable on shaft 20. A bell crank is swingable about shaft 20 as a pivot, the free end of one arm 16 of the bell crank engaging cam 15 by means of a pin 17 fixed to the arm. At the free end of the other arm 18 of the bell crank is a pin 19 on which a sector gear 11, meshing with pinion 12, is pivotable. To the other side of pin 19, the sector gear has an extension arm 10 having a pin 9 at its extreme end to engage with cam 8. In this embodiment, lens aperture indicator 4 is in the form of a flange of a spring barrel 21 in which a spiral spring 22 is housed. The ends of spring 22 are affixed to spring barrel 21 and pivot shaft 20, respectively. A cover or disk 23 covering spring barrel 21 has a central aperture serving as a bearing for shaft 20 and the lens aperture indicator 4 is biased to turn counterclockwise, as indicated by arrow *a* in Figure 2.

The operation of the device is as follows: The counterclockwise rotation of lens aperture indicator 4 by spiral spring 22 rotates arm 10 on its pivot 19 by means of pinion 12 and sector gear 11, as indicated by arrow *b*, and presses pin 9 to the periphery of cam 8. After engagement of pin 9 and cam 8, pivot 19 rotates bell crank arm 18 about its pivot shaft 20, thereby rotating the bell crank counterclockwise, pressing pin 17 on cam 15. It should be noted that pins 9 and 17 are maintained in contact with cams 8 and 15, respectively, only by means of spring 22.

On rotating the emulsion speed indicator 3 until the desired emulsion index number of the film loaded in the camera is indicated by reference mark 24, the bell crank is swung to displace pivot 19, and lever 10 rotates about the contact point of pin 9 and cam 8. The swing of lever 10 rotates pinion 12 and lens aperture indicator 4. The cam lifts and the lever gear ratios are predetermined in such relation that a movement through one graduation of emulsion speed indicator 3 or of shutter speed indicator 2 moves lens aperture indicator 4 through one graduation. When shutter speed dial 2 is rotated until a desired shutter speed is indicated by the reference mark 25, lever 10 swings about pivot 19, and lens aperture indicator 4 is rotated by means of sector gear 11 and pinion 12. Each graduation of shutter speed indicator 2 corresponds to one graduation of lens aperture indicator 1, as above described.

Such construction of the exposure meter permits obtaining directly the proper lens aperture corresponding to each shutter speed setting, and, moreover, the setting of the aperture indicated is coupled to the superimposed regulation of the shutter speed and emulsion speed indicators. Easy operation of the device and high accuracy are the remarkable features of this invention.

What I claim is:

1. A photographic exposure meter of the rotatable armature type for coupling with the shutter speed control member of a camera, comprising a meter housing, a rotatable shutter speed indicator on the shutter speed control member of the camera, a rotatable film speed indicator mounted on the housing, a fixed shaft within the housing, a lens aperture indicator supported on the shaft, a spring encircling the fixed shaft and biasing the lens aperture indicator in a predetermined direction, the housing defining an arcuate aperture coaxial with the lens aperture indicator, a pinion integral with the lens aperture indicator and rotatable in unison therewith, a first multi-step cam integral with the shutter speed indicator, a second cam integral with the film speed indicator, a bell crank pivotable about the fixed shaft, a first pin on one arm of the bell crank engaging the periphery of the second cam, a second pin at the free end of the other arm of the bell crank, a lever having a sector gear at one free end and an elongated arm at its other end region pivotally mounted at its intermediate region on the second pin, a third pin at the free end of the elongated arm engaging the periphery of the first cam, a needle pointer integral with the rotatable armature of the exposure meter, a composite graduated scale plate between the lens aperture indicator and the needle pointer, and reference marks on the housing cooperating with the shutter speed and film speed indicators respectively, so that on setting the desired shutter speed and film speed graduation of the respective indicators with their cooperating reference marks and illuminating the exposure meter with the light from the object to be photographed, the pointer needle gives a direct reading of the required lens aperture on the lens aperture indicator.

2. The exposure meter according to claim 1 in which each graduation of each of the three indicators is double the value of the immediately preceding graduation and half the value of the immediately succeeding graduation, and every movement of the shutter speed and film speed indicators through one graduation corresponds to a movement of one graduation of the lens aperture indicator.

3. A photographic exposure meter for incorporation in a camera comprising a rotatable shutter speed indicator protruding from the camera housing and secured to the shutter speed control member of the camera, a film speed indicator adjustably mounted on the camera housing and protruding from the housing, a lens aperture indicator rotatably supported within the camera housing, a pinion integral with the lens aperture indicator, a multi-step cam integral with the shutter speed indicator, a cam integral with the film speed dial, a bell crank pivotally swingable on the shaft of the lens aperture indicator, a first pin affixed to the free end of one arm of the bell crank to engage with the cam integral with the film speed indicator, a pivot pin affixed to the free end of the other arm of the bell crank, a sector pivoted on the pivot pin of the bell crank arm and meshing with the pinion integral with the lens aperture indicator, an extension arm from the sector gear toward the multi-step cam, a second pin affixed to the free end of the extension arm to engage the multi-step cam, a pointer needle secured to the exposure meter coil and extending radially therefrom, composite stripe graduations interconnecting the pointer needle and the lens aperture indicator, a pair of reference marks on the camera housing for setting thereat the shutter speed and film speed indicators respectively, and a spring biasing the pinion in a predetermined direction.

4. A photographic exposure meter according to claim 3 in which the exposure meter in plan view has the identical shape as the plan view of the camera housing.

References Cited in the file of this patent
UNITED STATES PATENTS

| | | |
|---|---|---|
| 2,340,622 | Simmon | Feb. 1, 1944 |
| 2,341,393 | Simmon | Feb. 8, 1944 |
| 2,360,256 | Mihalyi | Oct. 10, 1944 |